Feb. 8, 1949.  F. W. MEWHERTER  2,461,227
SKIPPER-PROOF MEAT CASE
Filed Jan. 8, 1947  2 Sheets-Sheet 1
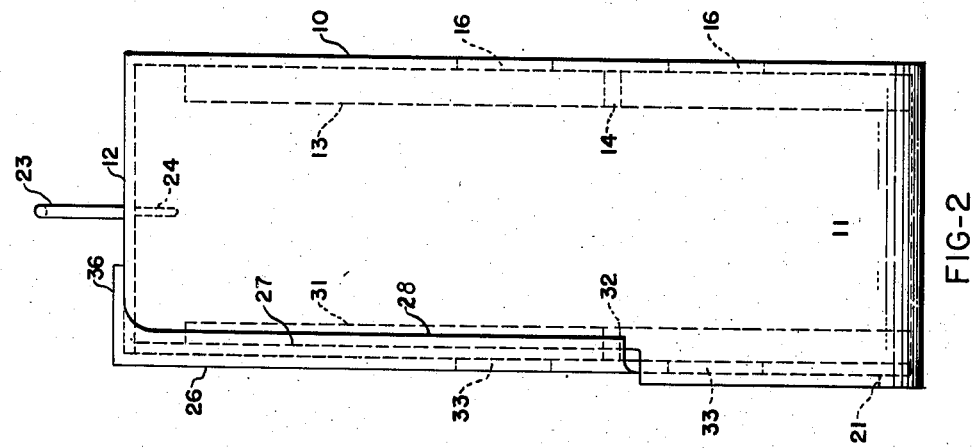
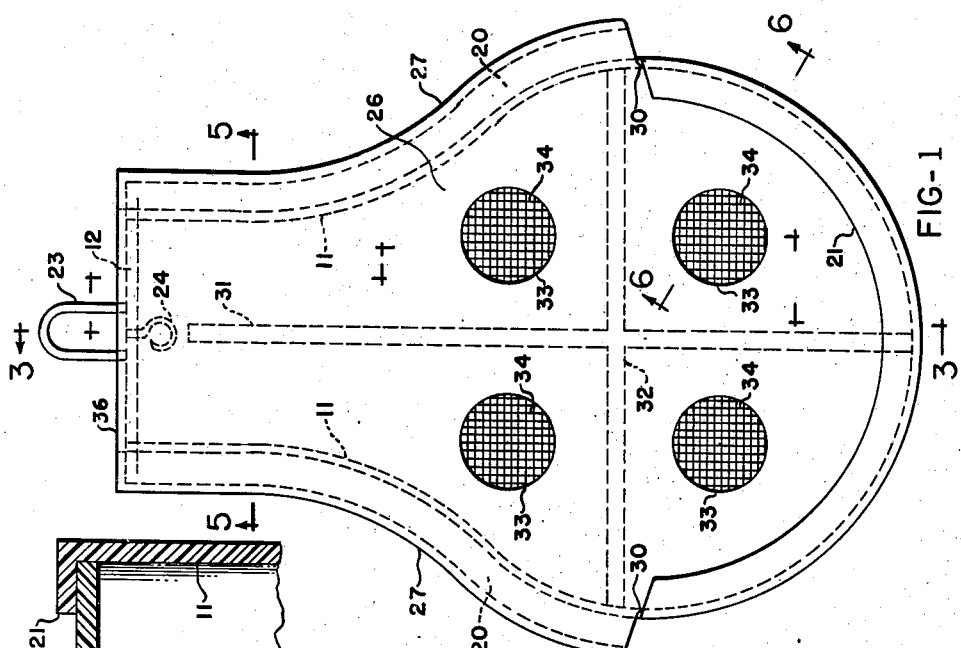
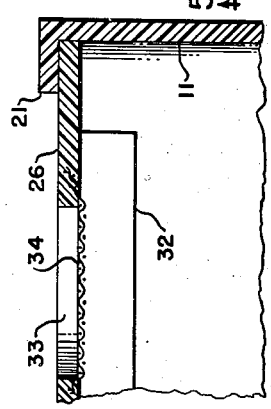
Inventors:
FRANK W. MEWHERTER
EDWARD E. SMITH
By
Attorney

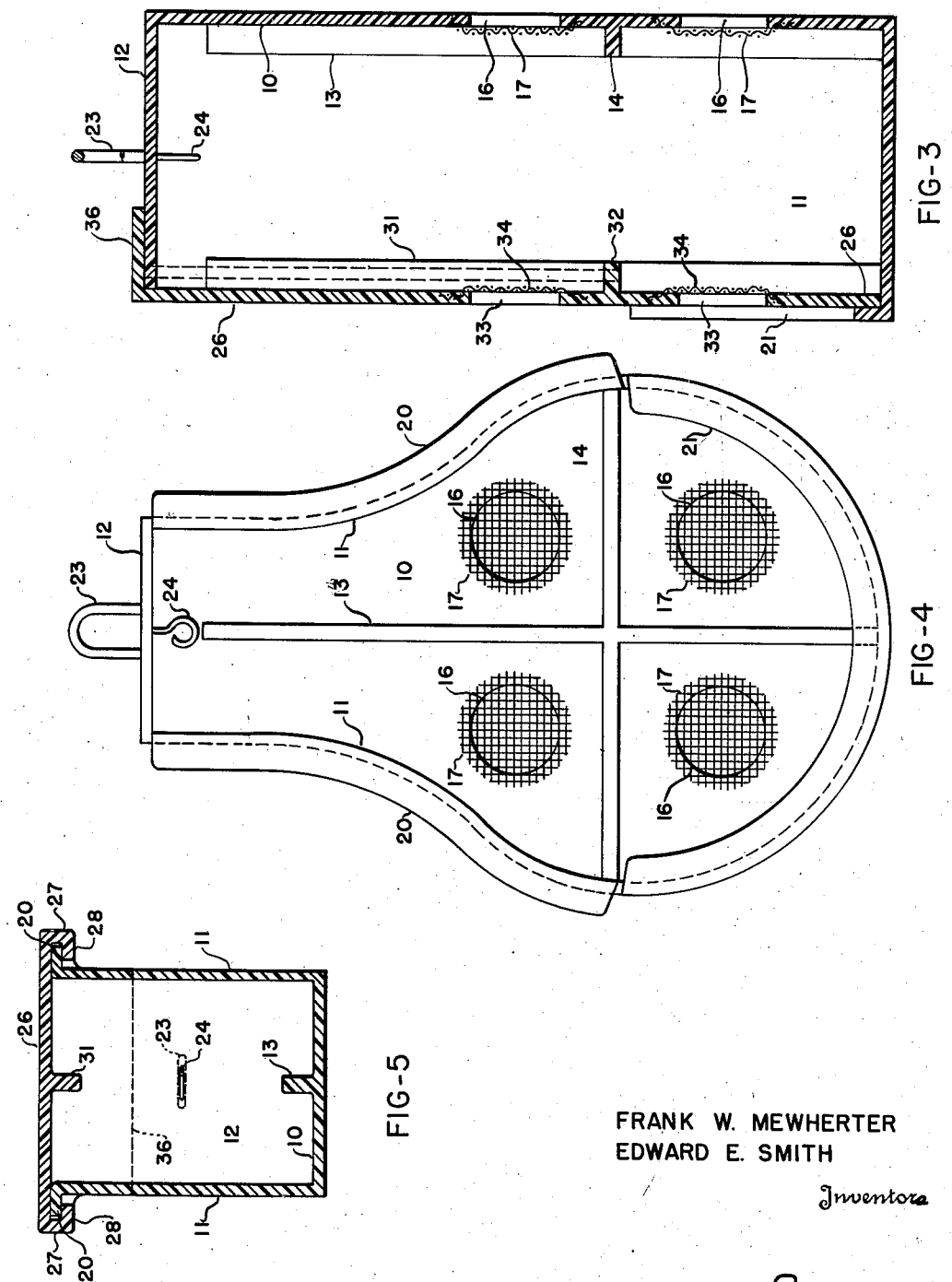

Patented Feb. 8, 1949

2,461,227

UNITED STATES PATENT OFFICE 2,461,227

SKIPPERPROOF MEAT CASE

Frank W. Mewherter and Edward E. Smith, Raeford, N. C.

Application January 8, 1947, Serial No. 720,877

3 Claims. (Cl. 99—269)

This invention relates to a meat case and more especially to a skipper-proof meat case for keeping cured meat so that skipper flies and other insects cannot gain access thereto.

It is a well-known fact that when hogs are slaughtered the hams, the shoulders, the middlings, or side meat, are salted the proper amount and allowed to cool and then after curing for a predetermined length of time, say from four to eight weeks, these pieces of meat are treated with borax, black pepper and the like to give a suitable dressing thereto and to fill up all crevices with this dressing so as to prevent skipper flies from laying their eggs in these crevices, because if they do, certain larvae are hatched from these eggs which proceed to eat into the meat causing spoilage of the same. It is quite a problem for farmers to prevent spoilage of their year's supply of meat on account of skippers gaining access to certain crevices in the hams and shoulders and middlings and depositing their eggs therein which hatch into larvae or worms, which are closely related to maggots but are of different variety, but nevertheless, they bore their way into the meat and cause spoilage thereof.

In order to eliminate this danger we have provided a suitable meat case which although is shown as being shaped to accommodate a ham or shoulder, it is quite evident that the meat case embodying the same mechanism and principles as herein shown can be made substantially rectangular in shape so as to accommodate the middlings or side meat which are the pieces of meat cut from the hog between the hams and shoulders.

It is therefore an object of this invention to provide a meat case having means for suspending a piece of meat such as a ham, shoulder, middling or the like, therein and having internal ribs which serve not only for reinforcing purposes but which prevent the meat from touching the walls of the meat case, especially the walls which have ventilation openings therein and this causes the pieces of meat to be out of contact with any skipper flies which might alight on the screened ventilated openings the meat case, said meat case having a suitable lid and the meat case and the lid having suitable cooperating flanges, whereby, when the lid is placed in position the meat case will be sealed absolutely against entrance of any skipper flies, or other insects or vermin and ventilating openings allow sufficient ventilation within the meat case, but these openings are screened with a fine screen so as to prevent entrance of any undesirable insects, vermin, and the like.

It is another object of this invention to provide a meat case having means for suspending a piece of cured meat therein and having ventilating openings for allowing the proper circulation of air therethrough and having reinforcing ribs on the interior surface thereof for holding the piece of meat in spaced relation to the walls of the meat case and said meat case being provided with a lid and the lid and the case having suitable cooperating flanges whereby the lid when in closed position absolutely leaves no opening for the entrance of skipper flies, vermin, insects and the like.

It is another object of the invention to provide a ventilated meat case, which is not only useful for protecting meats from skipper flies, but can also be used for protecting freshly killed meat against blow flies, should the weather moderate after slaughter to where such flies might attack the meat.

Some of the objects of the invention having been stated, other objects will appear as the description proceeds when taken in connection with the accompanying drawings in which Figure 1 is a front elevation of the meat case with the lid in position;

Figure 2 is an edge elevation of the meat case looking from the right-hand side of Figure 1;

Figure 3 is a vertical sectional view taken along the line 3—3 in Figure 1;

Figure 4 is a view similar to Figure 1 but showing the lid removed;

Figure 5 is a sectional view taken along the line 5—5 in Figure 1;

Figure 6 is a sectional detail view taken along the line 6—6 in Figure 1.

Referring more specifically to the drawings, the numeral 10 indicates the back or bottom portion of the meat case which has integral therewith a sidewall 11. The side-wall 11 in the present form of the invention is restricted at its upper end for the reception of the shank of a ham or shoulder, although in a meat case for a middling as above stated, the side walls will be substantially rectangular. The upper ends of the sidewall are closed by a wall 12. The rear wall or bottom wall 10 has a longitudinally extending rib 13 and a transverse rib 14 for reinforcing purposes and also to keep the meat from touching the wall 10.

The bottom or rear wall 10 has a plurality of openings 16 therein, each of which is covered by a very fine section of screen wire 17 which is preferably molded into the wall 10 as it is preferable to make this meat case of plastic material, though if it were made of metallic material the screen portions 17 would be welded or soldered thereto and if made of wood they could be tacked or otherwise secured thereto.

The upper portion of the side wall 11 has an out-turned flange 20 on each side thereof extending from the top restricted portion down to an intermediate portion where these flanges stop and the lower portion of the side wall 11 has an inturned flange 21.

The top portion 12 has a suitable staple or loop member 23 projection from the exterior surface thereof by which the case can be suspended from any suitable support. The inner or lower surface of the top portion 12 has a suitable hook 24 projecting downwardly therefrom to which the piece of meat can be attached for suspending the same when the meat case with the piece of meat is suspended on the looped portion 23.

The lid portion is designated broadly at 26 and along its upper portion has an out-turned flange 27 on each side thereof which is turned downwardly and inwardly as at 28 to provide a groove into which the out-turned flanges 20 of the side walls 11 fit.

The lid member 26 has its lower portion devoid of flanges and this lower portion is adapted to fit into and in beneath flange 21 extending inwardly from the lower portion of the side wall 11. The lid member 26 is beveled as at 30 on each side thereof to cause this beveled portion to wedge in beneath the flange 21 to thereby seal this point between the flange 27 and the flange 21 against entrance of any vermin, flies and the like. The lid portion 26, likewise, has a longitudinally extending rib 31 and a transverse rib 32 integral with the interior surface thereof and the lid portion 26 has a plurality of openings 33 covered by fine screen wire 34 which has its outer portions imbedded in the lid or front wall 26 in case it is made of plastic or this screen wire can be soldered to the front wall or cover 26 in the event it is made of metal, or if it is made of wood it can be tacked or otherwise secured to the interior surface of the front wall or cover 26. The upper end of the front wall or cover 26 has an inturned lip portion 36 which is adapted to fit against the top 12 of the case.

It is thus seen that we have provided a meat case which has sufficient ventilation by the provision of openings with fine screen wire thereover and which provides a compartment in which a piece of meat can be placed for preventing insects or other vermin from having access thereto and having a lid member quickly removable and quickly insertable into closing position so as to quickly gain access to the meat when it is desired to use a portion thereof from time to time.

In the drawings and specification there has been set forth a preferred embodiment of the invention and although specific terms are employed, they are used in a generic and descriptive sense only and not for purposes of limitation, the scope of the invention being defined in the claims.

We claim:

1. A case for preserving cured meat and the like comprising a back member and side walls and a top member, the top member having means on the exterior thereof for suspending the case from a suitable support and having suspending means on the interior thereof from which a piece of meat may be suspended, said side walls on their upper portions having out-turned flanges and the lower portion having an inturned flange, a lid member having the upper portion of its outer edges turned outwardly, downwardly and inwardly to fit over the out-turned flange on the upper portion of the wall member and having its lower portion devoid of flanges and adapted to fit inside the inturned flange on the lower portion of the side wall.

2. A case for preserving cured meat and the like comprising a back member and side walls and a top member, the top member having means on the exterior thereof for suspending the case from a suitable support and having suspending means on the interior thereof from which a piece of meat may be suspended, said side walls on their upper portions having out-turned flanges and the lower portion having an inturned flange, a lid member having the upper portion of its outer edges turned outwardly, downwardly and inwardly to fit over the out-turned flange on the upper portion of the wall member and having its lower portion devoid of flanges and adapted to fit inside the inturned flange on the lower portion of the side wall, the back member and the lid member both having raised projections on the interior surface thereof for holding the meat in spaced relation to the back member and the lid member and the back member and the lid member both having suitable openings therein with screens covering the openings to permit ventilation of the meat case but preventing ingress of vermin, flies and the like.

3. A meat case comprising a box member and a lid member therefor, the box member having a sidewall provided with outturned flanges for portions of its periphery and having an inturned flange thereon for another portion of its periphery and a lid member having portions of its outer edges provided with internal grooves adapted to fit over the out-turned flanges of the sidewall and the lower portion of the lid member being adapted to fit beneath the inturned flange on the other portion of the sidewall, the bottom of said box member having internal projections on its inner surface and said lid member having projections on its inner surface for holding a piece of meat in spaced relation to the walls of the meat case.

FRANK W. MEWHERTER.
EDWARD E. SMITH.

REFERENCES CITED

The following references are of record in the file of this patent:

UNITED STATES PATENTS

| Number | Name | Date |
| --- | --- | --- |
| 804,110 | Favorite et al. | Nov. 7, 1905 |
| 901,302 | Leilich | Oct. 13, 1908 |